(12) United States Patent  (10) Patent No.: US 8,550,147 B2
Lansinger  (45) Date of Patent: Oct. 8, 2013

(54) WINDSHIELD WASHER FLUID HEATER AND SYSTEM

(75) Inventor: Jere R. Lansinger, Camano Island, WA (US)

(73) Assignee: Clear Vision Associates, LLC, Camano Island, WA (US)

(*) Notice: Subject to any disclaimer, the term of this patent is extended or adjusted under 35 U.S.C. 154(b) by 1041 days.

(21) Appl. No.: 12/541,207

(22) Filed: Aug. 14, 2009

(65) Prior Publication Data

US 2010/0037415 A1  Feb. 18, 2010

Related U.S. Application Data

(60) Provisional application No. 61/089,577, filed on Aug. 18, 2008.

(51) Int. Cl.
 *B60S 1/46* (2006.01)
(52) U.S. Cl.
 USPC .......... 165/41; 165/47; 165/51; 165/141; 165/154; 165/179; 239/128; 239/129; 239/130; 239/131; 219/202
(58) Field of Classification Search
 USPC .......... 165/154, 155, 156, 141, 179, 41, 165/51, 47; 239/129, 130, 128, 131; 219/202
 See application file for complete search history.

(56) References Cited

U.S. PATENT DOCUMENTS

| | | |
|---|---|---|
| 1,153,095 A | 9/1915 | Martin |
| 1,228,482 A | 6/1917 | Schonger |
| 1,410,487 A | 3/1922 | McCarty |
| 1,465,292 A | 8/1923 | Wessig |
| 1,490,168 A | 4/1924 | Ford |

(Continued)

FOREIGN PATENT DOCUMENTS

| | | |
|---|---|---|
| DE | 197803 C | 4/1908 |
| DE | 2011695 A1 | 9/1971 |

(Continued)

OTHER PUBLICATIONS

International Search Report and Written Opinion dated Feb. 8, 3012 in relation to PCT/US12/067822.

*Primary Examiner* — John Ford
(74) *Attorney, Agent, or Firm* — Gifford, Krass, Sprinkle, Anderson & Citkowski, P.C.

(57) ABSTRACT

A windshield washer fluid heater having a housing which defines a housing chamber. A subhousing is disposed in the housing chamber. This subhousing is constructed of a thermally conductive material and divides the housing chamber into an outer housing chamber between the housing and the subhousing, and an inner housing chamber inside the subchamber. The outer housing chamber and inner housing chambers are fluidly isolated from each other. A core is disposed in the inner housing chamber thus forming an annular fluid chamber between the core and the subhousing. A washer fluid inlet on the housing is open to one end of the annular chamber while a washer fluid outlet at the other end is open to the other end of the annular chamber. An engine coolant inlet is open to the outer chamber while an engine coolant outlet is also open to the outer chamber at a position spaced from the inlet so that fluid flow into the coolant inlet flows through the outer housing chamber and to the coolant outlet. Alternatively, an electric heater is used to heat the housing chamber containing the annular fluid chamber.

8 Claims, 16 Drawing Sheets

(56) References Cited

U.S. PATENT DOCUMENTS

| | | | | |
|---|---|---|---|---|
| 1,556,030 | A | 10/1925 | Redshaw | |
| 1,650,922 | A | 11/1927 | Worthington | |
| 1,733,408 | A | 10/1929 | Herber | |
| 1,835,833 | A | 12/1931 | Williams | |
| 1,917,141 | A | 7/1933 | Middleton | |
| 1,933,220 | A | 10/1933 | Petree | |
| 2,002,426 | A * | 5/1935 | Allyne | 165/128 |
| 2,032,998 | A | 3/1936 | Mickadelt | |
| 2,056,776 | A | 10/1936 | Evans et al. | |
| 2,125,154 | A | 7/1938 | Dillon | |
| 2,258,922 | A | 10/1941 | Albee | |
| 2,260,904 | A | 10/1941 | Horton | |
| 2,357,426 | A | 1/1945 | Patterson | |
| 2,576,198 | A | 11/1951 | Stuart | |
| 2,662,154 | A | 12/1953 | Cochran | |
| 2,738,408 | A | 3/1956 | Cheviron | |
| 2,839,773 | A | 6/1958 | McMillen | |
| 2,847,193 | A * | 8/1958 | Carter | 165/11.1 |
| 2,894,730 | A * | 7/1959 | Agule | 165/74 |
| 2,900,168 | A | 8/1959 | Nyborg | |
| 2,947,020 | A | 8/1960 | Wilfert | |
| 2,968,071 | A | 1/1961 | Di Perna | |
| 3,135,004 | A | 6/1964 | Naigraw | |
| 3,243,119 | A | 3/1966 | Merkle | |
| 3,292,866 | A | 12/1966 | Benner | |
| 3,319,891 | A | 5/1967 | Campbell | |
| 3,321,792 | A | 5/1967 | Senkewich | |
| 3,366,336 | A | 1/1968 | Neuschwanger et al. | |
| 3,371,368 | A | 3/1968 | Walker | |
| 3,408,678 | A | 11/1968 | Linker | |
| 3,416,428 | A | 12/1968 | Heller | |
| 3,427,675 | A | 2/1969 | Tibbet | |
| 3,447,186 | A | 6/1969 | Senkewich | |
| 3,473,348 | A * | 10/1969 | Bottum | 165/154 |
| 3,479,689 | A * | 11/1969 | Kurzke et al. | 425/86 |
| 3,489,884 | A | 1/1970 | Waseleski, Jr. | |
| 3,493,041 | A * | 2/1970 | Hourwitz et al. | 165/147 |
| 3,560,706 | A | 2/1971 | Fonseca | |
| 3,568,766 | A * | 3/1971 | Thomas | 165/183 |
| 3,574,881 | A | 4/1971 | Temple | |
| 3,591,887 | A | 7/1971 | Keddie | |
| 3,632,042 | A * | 1/1972 | Goulish et al. | 239/130 |
| 3,688,081 | A | 8/1972 | Speich | |
| 3,738,252 | A | 6/1973 | Cardinale | |
| 3,756,510 | A | 9/1973 | Nitterl et al. | |
| 3,757,088 | A | 9/1973 | Osborn | |
| 3,835,294 | A | 9/1974 | Krohn et al. | |
| 3,868,492 | A | 2/1975 | Taylor | |
| 3,887,004 | A * | 6/1975 | Beck | 165/179 |
| 3,888,412 | A | 6/1975 | Lindo | |
| 3,935,425 | A | 1/1976 | Weissberger et al. | |
| 4,037,286 | A | 7/1977 | Medearis et al. | |
| 4,059,882 | A * | 11/1977 | Wunder | 165/154 |
| 4,085,308 | A | 4/1978 | Youngquist | |
| 4,088,269 | A | 5/1978 | Schlick | |
| 4,090,668 | A | 5/1978 | Kochenour | |
| 4,096,616 | A * | 6/1978 | Coffinberry | 165/154 |
| 4,096,910 | A | 6/1978 | Coffinberry et al. | |
| 4,109,133 | A | 8/1978 | Hanle et al. | |
| 4,127,763 | A | 11/1978 | Roselli | |
| 4,132,881 | A | 1/1979 | Ciarniello et al. | |
| 4,139,761 | A | 2/1979 | Obrowski | |
| 4,145,788 | A | 3/1979 | Ferrarelli | |
| 4,177,928 | A | 12/1979 | Bergkvist | |
| 4,180,723 | A | 12/1979 | Szupillo | |
| 4,212,425 | A | 7/1980 | Schlick | |
| 4,236,548 | A | 12/1980 | Howard | |
| 4,276,501 | A | 6/1981 | Fanz | |
| 4,285,540 | A | 8/1981 | Harada et al. | |
| 4,354,548 | A * | 10/1982 | Carlsson | 165/41 |
| 4,387,290 | A | 6/1983 | Yasuda | |
| 4,508,957 | A | 4/1985 | Rocchitelli | |
| 4,575,003 | A * | 3/1986 | Linker et al. | 165/41 |
| 4,665,351 | A | 5/1987 | Nyberg | |
| 4,700,424 | A | 10/1987 | Hagen | |
| 4,763,381 | A | 8/1988 | Williams | |
| 4,821,363 | A | 4/1989 | Delluc | |
| 4,821,797 | A * | 4/1989 | Allgauer et al. | 165/141 |
| 4,832,262 | A | 5/1989 | Robertson | |
| 4,834,172 | A * | 5/1989 | Duran | 165/141 |
| 4,862,951 | A | 9/1989 | Muller et al. | |
| 4,895,203 | A * | 1/1990 | McLaren | 165/41 |
| 4,910,380 | A | 3/1990 | Reiss et al. | |
| 4,967,437 | A | 11/1990 | Morse | |
| 5,010,289 | A | 4/1991 | Takada | |
| 5,046,216 | A | 9/1991 | Baungarter et al. | |
| 5,065,471 | A | 11/1991 | Laplante | |
| 5,099,909 | A | 3/1992 | Barigelli et al. | |
| 5,118,040 | A | 6/1992 | Abe | |
| 5,221,828 | A | 6/1993 | Basheer et al. | |
| 5,264,962 | A | 11/1993 | Kho | |
| 5,325,561 | A | 7/1994 | Kotlar | |
| 5,327,614 | A | 7/1994 | Egner-Walter et al. | |
| 5,354,965 | A | 10/1994 | Lee | |
| 5,383,247 | A | 1/1995 | Nickel | |
| 5,426,814 | A | 6/1995 | Minnick | |
| 5,509,606 | A | 4/1996 | Breithaupt et al. | |
| 5,522,453 | A * | 6/1996 | Green | 165/41 |
| RE35,890 | E * | 9/1998 | So | 165/154 |
| 5,881,428 | A | 3/1999 | Simmons | |
| 6,032,324 | A | 3/2000 | Lansinger | |
| 2004/0118939 | A1 | 6/2004 | Shank et al. | |
| 2007/0295825 | A1 | 12/2007 | McNaughton | |

FOREIGN PATENT DOCUMENTS

| | | |
|---|---|---|
| DE | 2914183 | 4/1979 |
| FR | 1194037 A | 11/1959 |
| GB | 2191390 | 12/1987 |
| JP | 2001-171487 A | 6/2001 |
| WO | WO 2005104690 A2 * | 11/2005 |

* cited by examiner

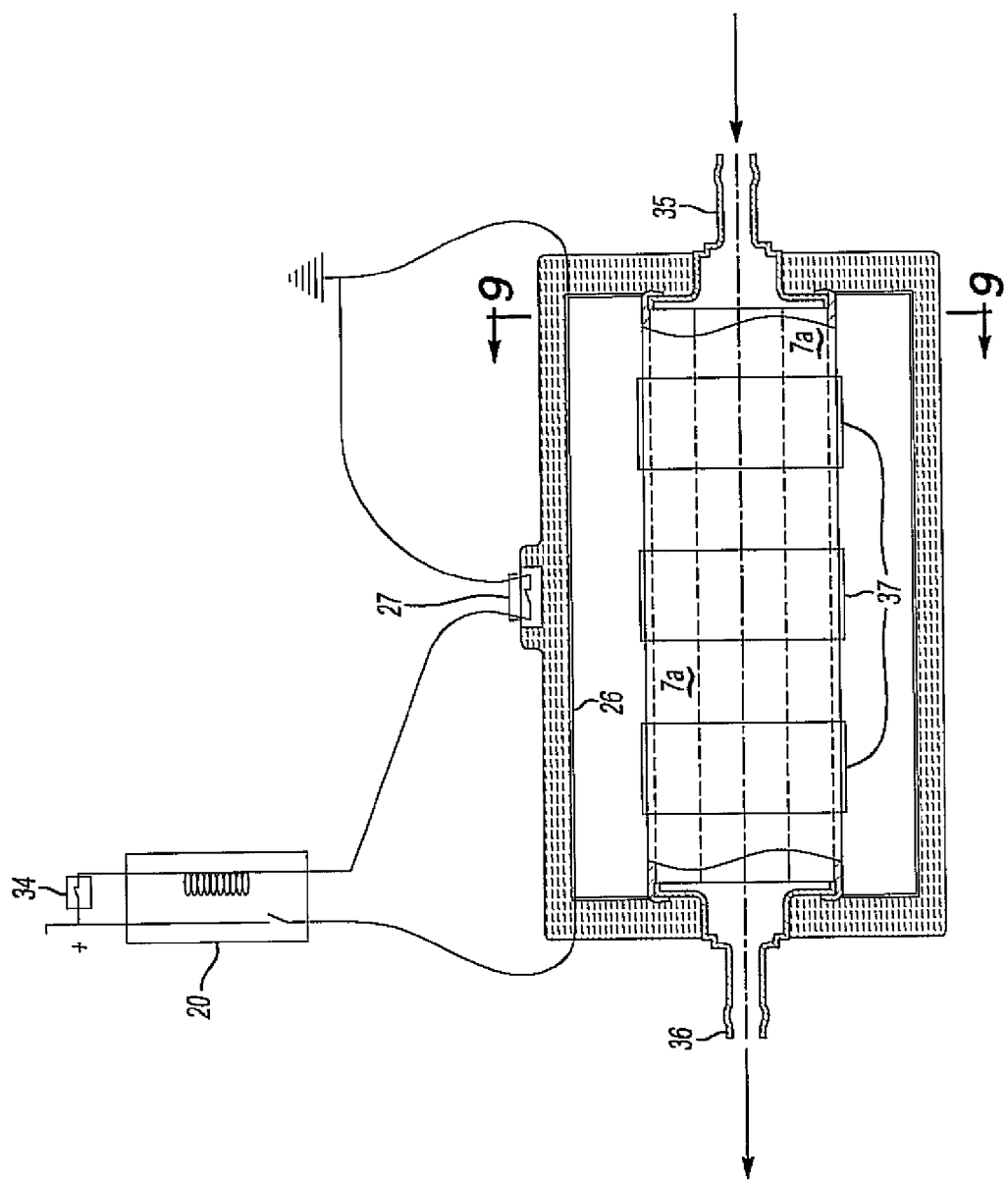

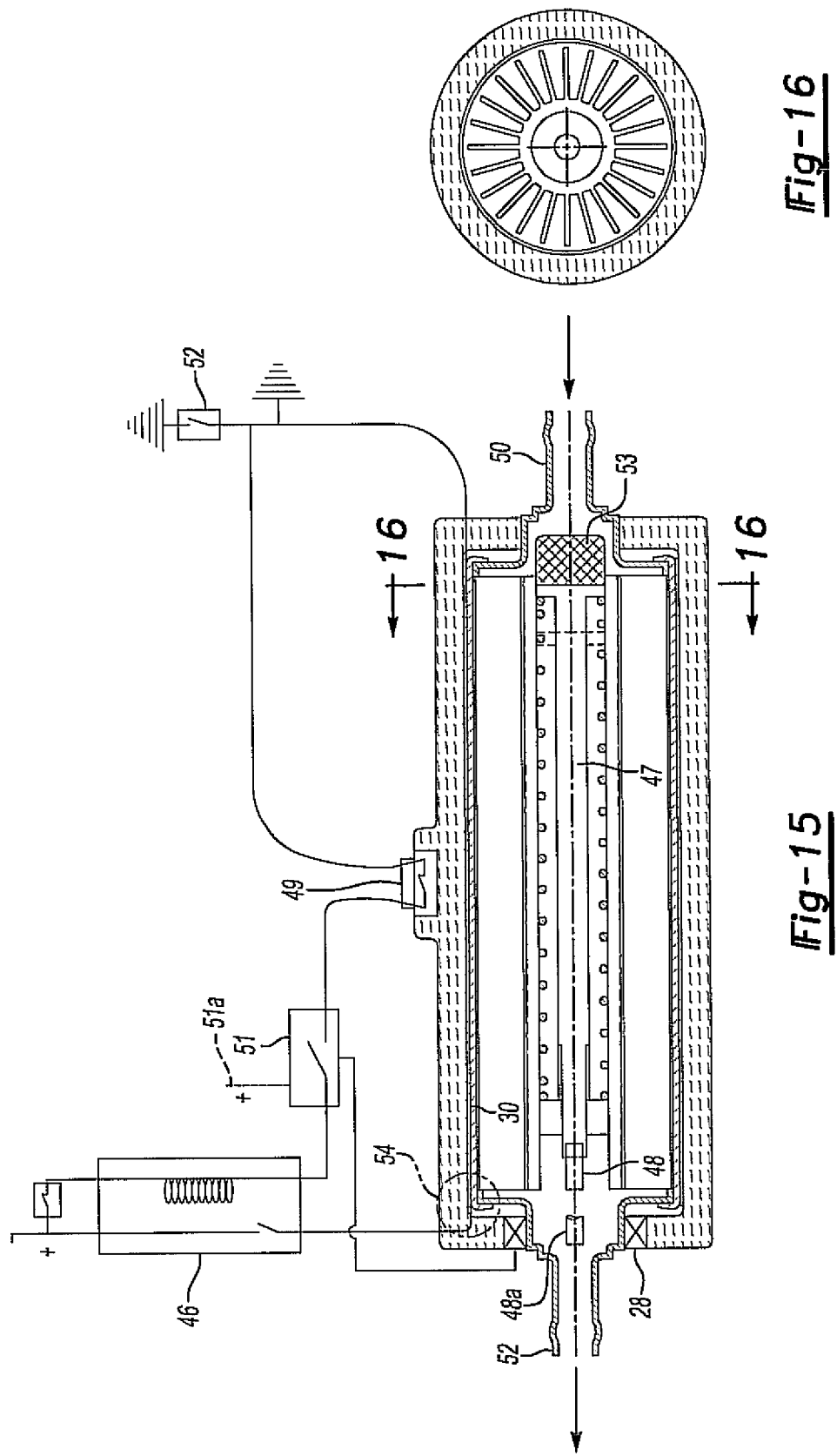

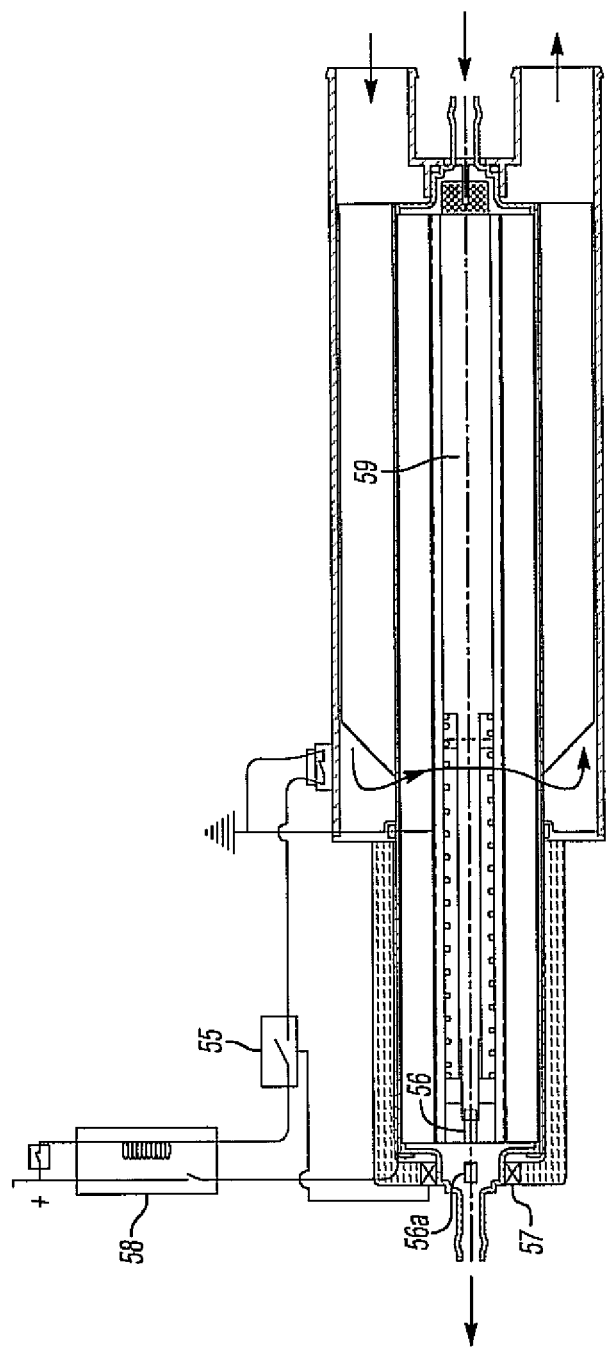
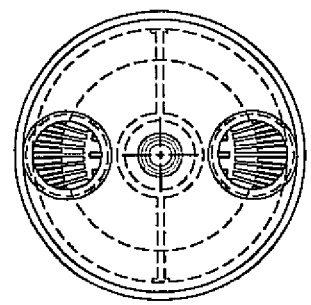
Fig-17
Fig-18

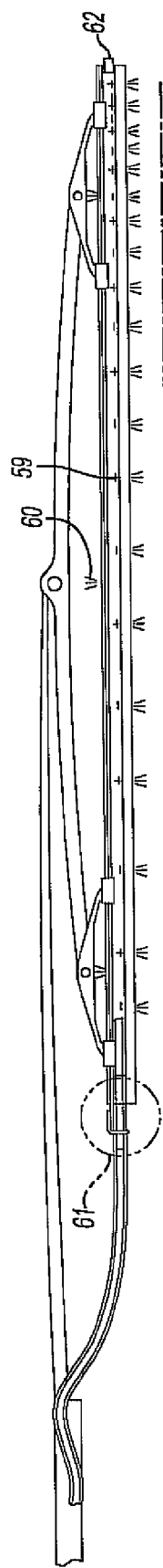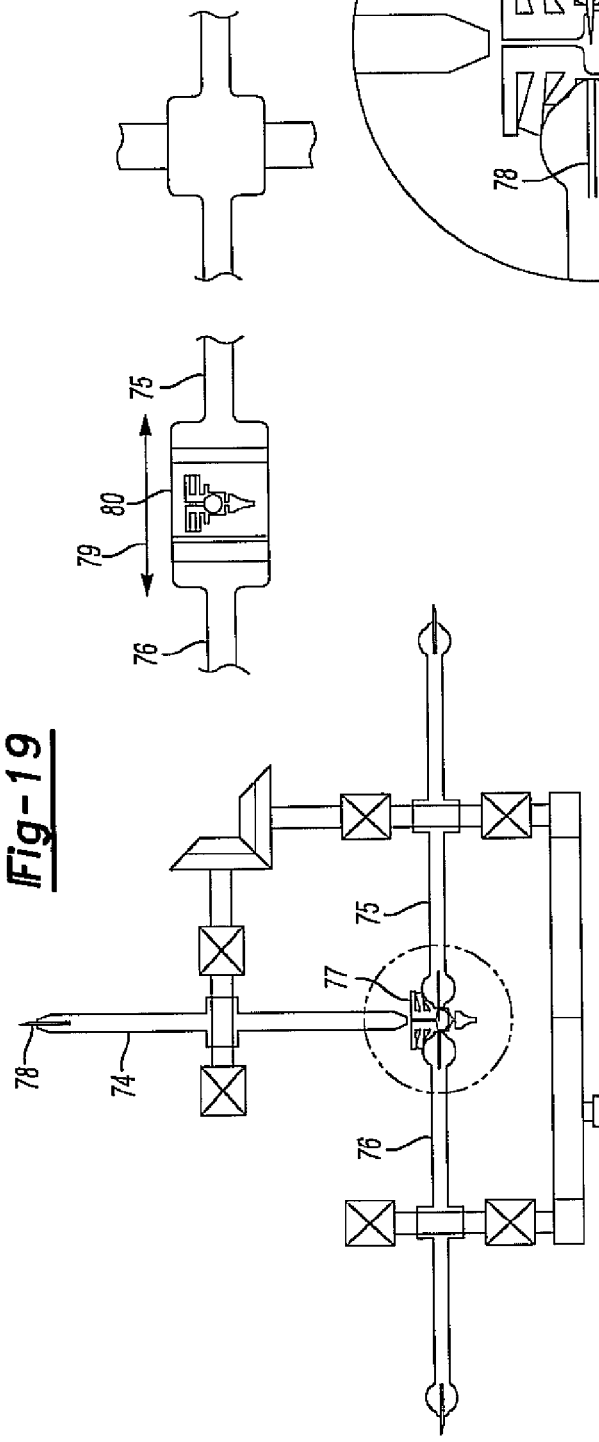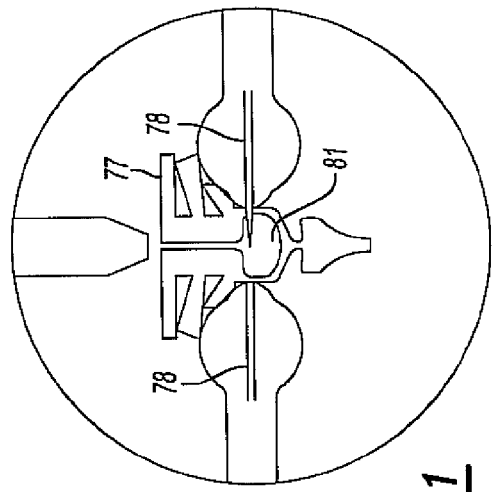

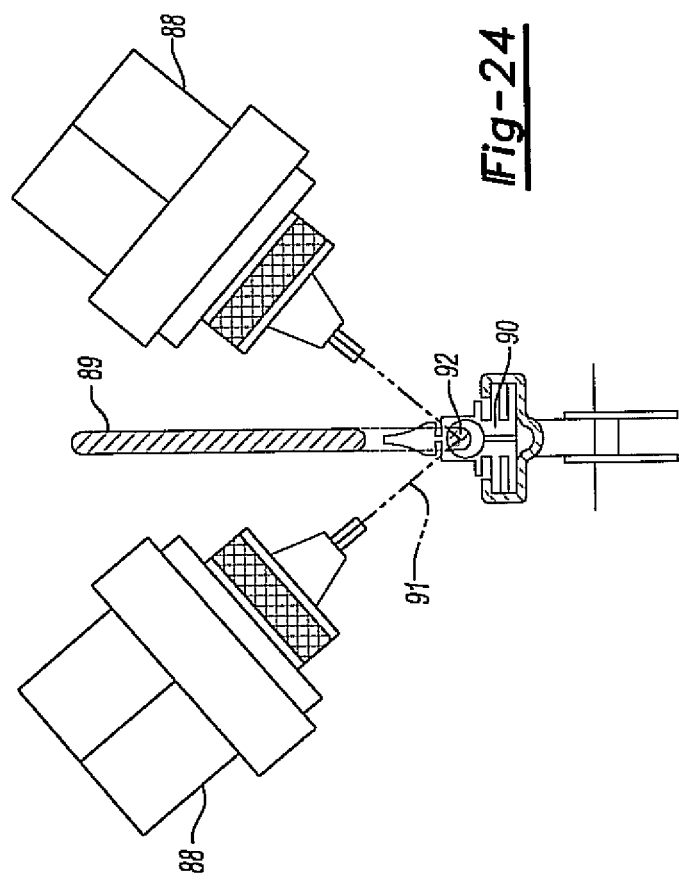
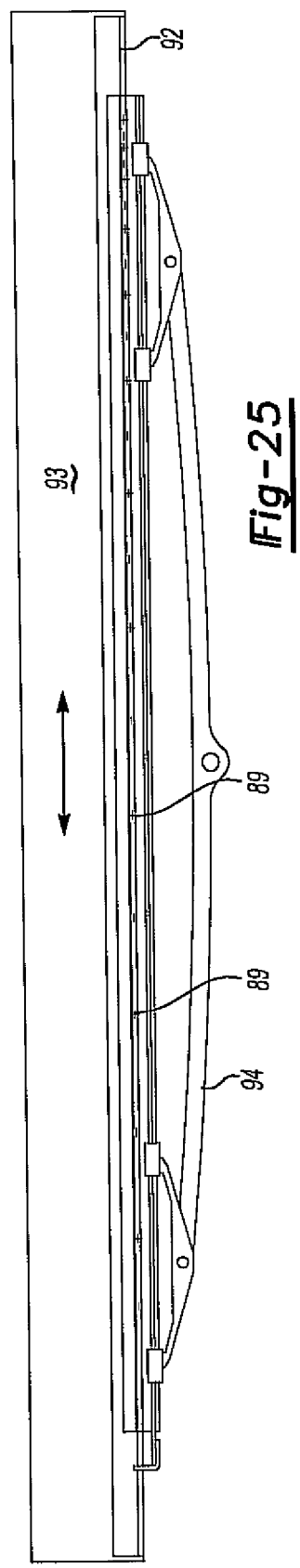
Fig-24
Fig-25

WINDSHIELD WASHER FLUID HEATER AND SYSTEM

CROSS-REFERENCE TO RELATED APPLICATION

This application claims priority of U.S. Provisional Patent Application Ser. No. 61/089,577 filed Aug. 18, 2008, which is incorporated herein by reference.

BACKGROUND OF THE INVENTION

1. Field of the Invention

The present invention relates to vehicle windshield defrosters and wipers using heated washer fluid.

2. Description of Related Art

Defrosting and deicing of motor vehicle windshields and wipers have been served by conventional warm air defrosters for many decades. There continues to be much driver dissatisfaction with the slow and otherwise poor performance of these defrosters for providing quick and safe driving visibility. Government mandated vehicle safety standards (e.g. FMVSS103 based on 1960s warm air automotive defroster minimal technology) set minimum defrosting performance requirements, yet still allow 30 minutes from cold engine start to clear a preset standard amount of frost at 0° F. Even modern (27.5 miles per gallon CAFE—Corporate Average Fuel Economy) vehicles still typically take 15-25 minutes to defrost the windshield on this test.

Consequently, in commonplace operation drivers often have to scrape ice from the windshield and knock ice off wiper blades or waste fuel and time waiting for the engine to warm up so the defrosters can work. Windshields are especially difficult to access effectively with ice scrapers, and the situation is exacerbated in the U.S.A. with the coming wave of 78 million elderly "baby boomers" having reduced agility to scrape ice from windshields. Also, evidence indicates global warming may be generating more intense storms including during winter.

Much better defroster performance is deemed necessary by many winter weather drivers, especially in light of better available technology such as electrically heated windshields and the even more effective emerging heated washer systems. Substantially intensifying this need for better defrosting systems is the rapidly emerging class of high fuel efficiency internal combustion engine, hybrid, plug-in hybrid electric, full battery electric and fuel cell electric vehicles to achieve the very challenging newly legislated 35.5 mpg CAFE requirement by 2015, a less oil dependent national economy (witness skyrocketing fuel prices) and more environmentally friendly vehicles.

Because of the high fuel efficiency of these coming new vehicles there is inherently much less "waste heat" energy available to enable traditional engine coolant heat based warm air defrosters and heaters to perform well. Automakers and their suppliers are now actively researching and developing new defroster and heater technologies such as heat storage, heat pumps, electrical heating, viscous friction heaters, coolant turbulence heaters and fuel fired heaters to meet the new needs of these highly fuel efficient vehicles. Present day conventional type vehicles of lesser fuel efficiency and greater "waste heat" will largely become obsolete. The common practice of warming up the engine for extended periods of time to defrost the windshield before driving is contrary to the now common goals of reducing pollution and energy dependence on foreign oil.

Remote start feature has been available on the aftermarket for many years and is recently becoming popular as an original equipment feature to enhance defrosting, heating and air conditioning performance. However anti-idling laws of many states and countries, in the interest of reducing air pollution and improving fuel economy, increasingly limit allowable idle time (now typically down to 5 minutes) and the remote start feature will tend to have corresponding idle time restrictions.

Electrically heated windshields can substantially reduce defrost time but have had limited use because of cost, complexity, poor reliability, and technical problems such as interference with electronic communications devices. Electric heated windshield replacement cost is many times more (examples of 5 times more have been discovered) than a conventional windshield and replacement data indicate the average vehicle has about 1½ windshields during its lifetime. Visible heating wires and heating films can also be distracting and degrade windshield clarity and transparency.

Electrically heated washer fluid systems spraying through conventional nozzles have had limited success in the aftermarket but have recently emerged on the original equipment market to augment windshield and wiper deicing performance of warm air defroster systems. Electrical overheating failure has resulted in at least one major product recall. One of the world's largest automakers has recently offered a heated washer system feature available on numerous models, and other automakers have also been planning to offer this feature. Still, even these systems exhibit poor performance, functionality and reliability in the opinion of many users. Although these heated washer systems can reduce the FMVSS103 defrost time from typically 15-25 minutes down to 5-10 minutes, drivers still desire much faster defrosting. Also, when driving in winter icing and blizzard conditions in which visibility becomes poor from iced up wipers and windshield, even with the aid of the warm air defroster on maximum output, available heated washer systems fail to quickly and effectively clear ice and often the driver still has to manually deice the wipers and windshield to achieve safe driving visibility. These heated washer systems commonly do not respond instantly upon driver demand to spray heated washer fluid. Fluid spray is delayed for 30-45 seconds while a small amount of fluid, e.g. 2 ounces, heats up to provide only a 2-3 second spray after which time there is another long delay to heat another small amount of fluid. This process typically takes about 2½ minutes to complete one deice cycle, with repeat cycles often needed. Confusing heated washer driver operated switch controls, along with already and increasingly complex modern instrument panel controls and displays, further add to the complexity and cost of these systems.

Heated washer systems using heat from engine coolant have long been available but also have had little success in the marketplace largely due to slow time to warm up upon engine cold start, low heat transfer rates, issues with washer heater freeze up damage and the heater purging its fluid from boiling of the high vapor pressure alcohol antifreeze laden washer fluid (about 158° F. boiling temperature) in the presence of 200+° F. engine coolant temperatures. Purging not only can waste washer fluid but, more importantly, causes significant delay in spray time from the resulting empty washer fluid heater having to become refilled, and the cold fluid then entering the heater does not have sufficient time to fully heat up as it quickly passes through the heater to get sprayed to the windshield. This limited fluid heat up from quick passage through the heater is largely due the commonly known heat transfer phenomenon of fluid boundary layer thickness (basically defined as the distance of the zero velocity fluid immediately adjacent the flow channel wall to the point at which there is 99% of the maximum flow velocity). In either laminar or turbulent flow, just a modestly thick boundary layer (e.g. 0.10 inches typical of tubular heaters) can prevent very high heat transfer flux in even otherwise well designed heat exchangers. Fortunately, because of relatively low required flow rate and pumping time of the washer fluid pump, and relatively low flow rate requirement of engine coolant (or heat pump fluid or other lower flow rate heating fluid) in the cabin heater circuit, it is possible to construct a very simple compact heat exchanger having an unusually high heat transfer rate. This heater concept, described as the object of this patent application, will have rather high, yet acceptable, flow restriction, with extremely low liquid volume relative to the area of the heat transfer fluid chambers, and with the extremely low liquid volume will therefore be inherently freeze protected because of the small freeze expansion of the small amount of fluid. Its heat transfer flux will be very high by virtue of the forced ultra thin, and therefore extremely low thermal resistance, boundary layers simply by virtue of uniformly and extremely thin flow channel construction, e.g. 0.010 inches (resulting in less than 0.005 inches thick boundary layer), of the washer fluid to be heated flow chamber and engine coolant heating fluid flow chamber. After extensively researching related subject matter this inventor has discovered no prior art of washer fluid heater or other multi liquid heat exchanger construction to make advantage this concept.

To avoid a contributing cause of windshield cracking automakers are known to limit heated washer fluid temperature contacting the windshield to no more than about 125° F. The concentrated thermal shock from hotter fluid than this coming from fluid concentrating conventional nozzles onto sensitive areas of the windshield, such as a small stone crack, scratch or subtle stress concentration at the windshield mounting edge, can readily propagate a large crack in the glass.

Heated washer fluid spray concentrating, and therefore high windshield thermal shocking, conventional nozzles, even of the wider spraying fluidic and spray fanning types, fail to provide the very high degree of broad and uniform heated fluid distribution needed to bring out the great deicing and bug clearing performance capability of an otherwise well engineered heated washer system. Only well designed heated fluid delivering wiper blades provide "close proximity to glass" fluid delivery and near perfectly uniform broad distribution that maximizes defrosting, deicing and bug cleaning performance, while minimizing washer fluid usage, and prove to be the most effective washing means. This broad and uniform distribution enables much higher temperature (e.g. 150° F.-175° F.) fluid to be safely delivered with minimal thermal shock for improved deicing and cleaning and without risk of windshield cracking or scalding of persons.

Another deficiency of available heated washer systems is that they cause the heated fluid to lose a large part of its heat energy through rapid wind chill evaporative cooling of the contained high vapor pressure alcohol antifreeze as the fluid sprays from the nozzles a foot or two through the cold air before reaching the mid and upper reaches of the windshield. The resulting large amount of midair condensing visible steam on actual tests by this inventor is clear evidence of this energy loss. This sudden cloud of steam can also cause momentary reduction of driver visibility, e.g. while making a left turn in the presence of oncoming traffic on a sunny day. Actual testing of my well designed fluid delivering squeegee wiper blade, as subsequently described herein, demonstrates almost total absence of this evaporative energy loss, with a resulting 50% or greater reduction in windshield deice time and fluid usage as compared with using heated fluid through conventional nozzles.

Often washer systems will be filled with water based fluid having insufficient antifreeze which subsequently freezes solid and causes washer heater permanent damage from ice expansion pressure. Washer heater design features to provide freeze protection typically add cost, and the increased complexity can run counter to increasing reliability.

Another shortcoming of available washer fluid heaters is that their effectiveness is inherently limited because, in between the short electronically programmed heated fluid squirts, the remaining heat of the fluid on the windshield and the now slightly warmed glass is quickly dissipated by evaporation and wind chill during the frequent and long fluid reheating delays between these short squirts. The result is delayed defrosting and even partial windshield refreezing while awaiting subsequent programmed heated short squirts which have to reheat the remaining ice to its melting point. This results in extended defrost times best measured in minutes. However actual testing of proof of concept working models of my invention demonstrates if the total heat energy required to melt and clear the ice is delivered in one relatively quick, continuous and very evenly distributed amount of heated fluid directly from the wiper blade rubber squeegee onto the windshield the time for complete defrosting is dramatically reduced to seconds.

Another deficiency of available washer fluid heaters is that they are prone to building up calcium scale and other mineral deposits from the long term heating of washer fluid continuously stored within the heating chamber. This is the same mechanism that causes heavy lime scale buildup in a teapot simmering water over a long period of time. These deposits can choke fluid passage, cause loss of heat transfer efficiency and break loose and clog washer nozzles.

A new heated washer system is needed which will fulfill the following requirements:

1. Upon washer activation must combine virtually instantaneous fluid delivery and heat up to substantial temperature with thermally efficient fluid delivery means such as a wiper blade squeegee that very uniformly distributes heated fluid externally traversing only a small fraction of an inch distance to be distributed directly onto the windshield ice. Must maintain full wiper blade flexibility in icing conditions for good wiping compliance to the windshield, and deliver the ice melting energy needed within a very short time—best measured in seconds. Must have an effective mass production manufacturing process for the wiper blade squeegee that will produce a fluid orifice/nozzle pattern that results in a nearly perfectly optimized distribution of fluid onto the windshield.
2. Should quickly defrost/deice windshield and wipers upon the driver's activation of the conventional steering column mounted washer switch soon after a cold engine start—typically within 20 seconds, or even automatically as could be activated by a windshield frost sensor.
3. Should quickly deice windshield and wipers—typically within 10 seconds—upon driver demand while driving in severe icing conditions.
4. Must be properly adaptable to highly fuel efficient (e.g. 35.5 mpg CAFÉ) vehicles such as low heat rejection internal combustion engines, plug-in hybrid electric, and totally electric vehicles such as battery and fuel cell operated, and also provide excellent defrosting performance for conventional internal combustion engine vehicles.

5. Should not require additional driver controls to operate compared to a vehicle not equipped with a heated washer system, i.e. should be operable by the existing conventional washer switch.
6. Should be resistant to build up of calcium scale and other mineral deposits within the heater.
7. Should be protected from freeze damage of washer fluid and engine coolant, and have 20 year/200,000 mile corrosion protection to meet expected future automotive durability requirements.
8. Must be price and manufacturing cost competitive with a minimum number of component parts.
9. Must be compact for easy vehicle packaging.

SUMMARY OF THE PRESENT INVENTION

The present invention provides a windshield washer fluid heater which overcomes the above-mentioned disadvantages of the previously known systems and fulfills the above stated nine requirements.

In brief, in a first preferred embodiment of the present invention, the heater includes an elongated housing which defines an elongated housing chamber. A subhousing is disposed in the housing chamber which divides the housing chamber into an outer housing chamber between the housing and the subhousing, and an inner housing chamber inside the subhousing. The subhousing is constructed of a thermally conductive material and the inner and outer housing chambers are fluidly isolated from each other.

A core is disposed inside the inner housing chamber thus forming an annular chamber between the core and the subhousing. Preferably, the core is dimensioned so that the ratio of the (area of the core)/(volume of the annular chamber) for the annular chamber exceeds 700 meters$^2$/meters$^3$. Consequently, the width of the annular chamber in the transverse direction is very small compared to the transverse size of the core.

A washer fluid inlet is open to the subhousing on one end of the annular chamber while a washer fluid outlet is open to the subhousing at the other end of the annular chamber. Similarly, an engine coolant inlet is open to the outer housing chamber while an engine coolant outlet is also open to the outer chamber at a position spaced from the inlet. Consequently, engine coolant flow into the engine coolant inlet flows through the outer housing chamber and to the engine coolant outlet.

In operation, the engine coolant rapidly warms washer fluid flowing through the annular chamber which is then expelled onto the engine windshield.

As an alternative to a coolant housed chamber, an electric heater can be utilized to heat the subhousing.

Even though the heated windshield wiper fluid can be sprayed directly onto the windshield from the automotive body, preferably the heated windshield wiper fluid is fluidly connected to a conduit in a windshield wiper blade. That windshield wiper blade, in turn, includes apertures provided through it to spray the heated wiper fluid onto the windshield.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 8 is a longitudinal sectional view of a second preferred embodiment of the present invention;

FIG. 9 is a sectional view taken along line 9-9 in FIG. 8;

FIG. 15 is a longitudinal sectional view of a further preferred embodiment of the present invention;

FIG. 16 is a view taken along 16-16 in FIG. 15;

FIG. 17 is a longitudinal sectional view illustrating a further preferred embodiment of the present invention;

FIG. 18 is an end view of the embodiment of FIG. 17;

FIG. 19 is a top view illustrating a preferred windshield wiper blade of the present invention;

FIG. 20 is a view illustrating an apparatus for the production of the windshield wiper blade;

FIG. 21 is an enlarged view of the circle in FIG. 20;

FIG. 24 is a diagrammatic view illustrating a manufacturing process for producing the wiper blades;

FIG. 25 is a side view of the wiper blade in FIG. 24;

DETAILED DESCRIPTION OF THE INVENTION

FIGS. 1-6 show construction of a washer fluid heater 96 using engine coolant (or other suitable fluid) as a heat source. This construction also shows a minimal component parts count of 8 pieces.

Figure 7:
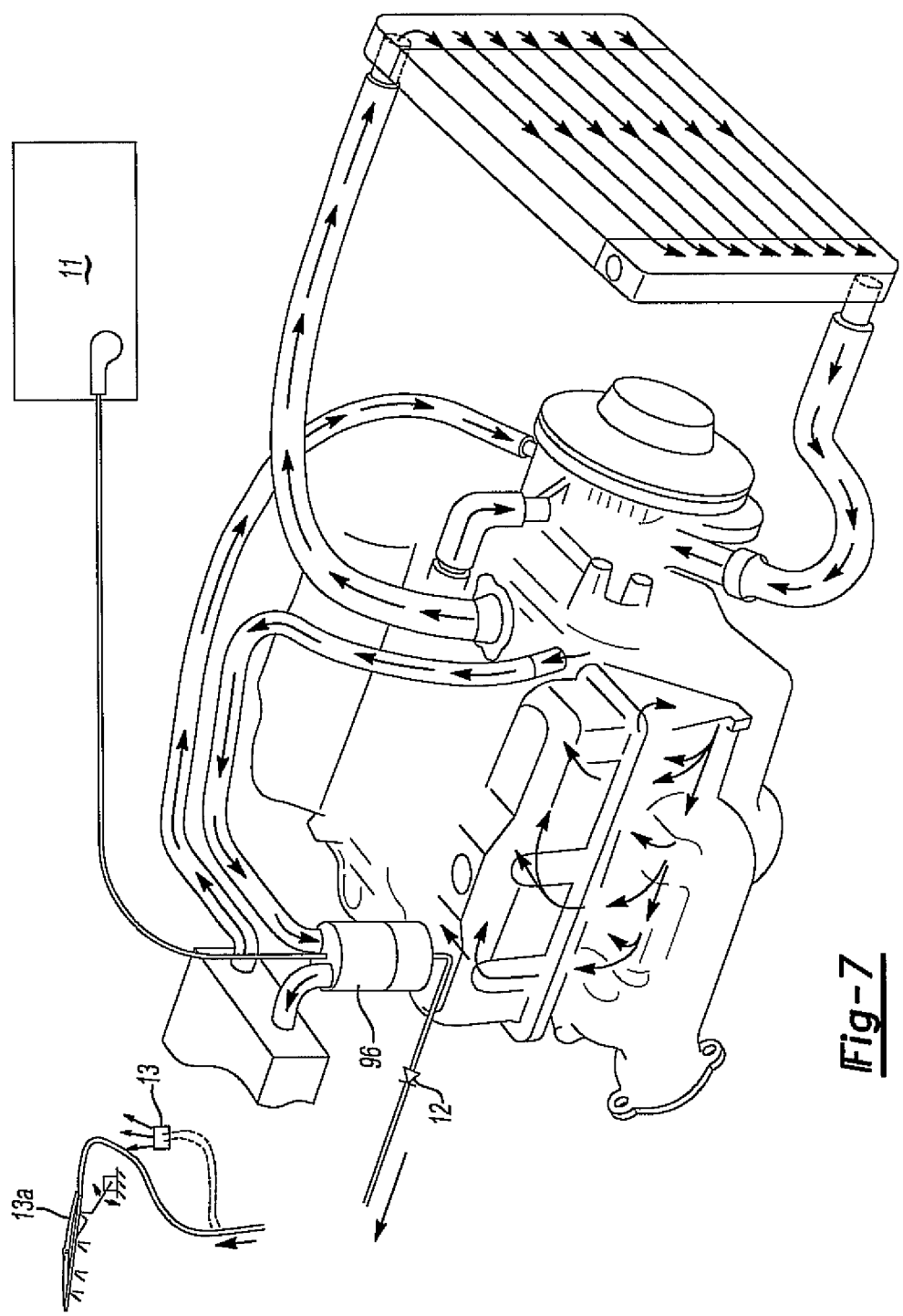
FIG. 7 is a diagrammatic view illustrating an internal combustion engine of the type used in automotive vehicles and having a subject washer fluid heater in the engine coolant circuit.

Warm engine coolant flows from the off center inlet hose barb 1 through an outer housing chamber 2 to the opposite end 22 of the heater then crosses over to the opposite side outer finned annulus half circular heat transfer chamber 3 and returns to the outlet hose off center barb 4. Outer finned half annuli 2 and 3 are sealingly separated at linear contact points 18 for the full length of the finned annuli and at coolant barb end dam 18*a*. Cold washer fluid 5 enters at its on-center inlet barb 6 on one end of the heater and flows very evenly distributed through the inner finned heat transfer chamber 7 with matching male finned and very closely and evenly spaced—approximately 0.010 inch constant clearance—center core 8, to opposite end on-center heated fluid outlet barb 9. The intermediate outer finned/inner finned member 10 is typically of aluminum extrusion construction having high heat conductivity and partially defines the heated fluid (e.g. washer fluid) flow heat transfer chamber 7 and is fluidly disposed in series between the source of a cleaning fluid to be heated, washer pump and reservoir 11 and a check valve 12 and a fluid nozzle 13 or 13*a* (re. FIG. 7). The core 8 is disposed within this enclosure 10 to almost completely fill it and is accurately positioned by means of four longitudinal center locating fin tip contact points 14 to maintain a uniform and close clearance (e.g. 0.010 inches) of the core surface to the heat conducting inner housing longitudinal wall 10*a* and at the inlet 15 and outlet 16 ends, thereby completing the formation of a very small volume washer fluid flow path heat conducting constant thickness fluid flow chamber 7. The center core 8 may or may not be constructed of a high heat conducting material and, for simplicity, is probably an aluminum extrusion and may serve as a thermal storage mass, and may be hollowed and sealed (not illustrated) to contain a thermal phase change material (PCM) to enhance heater initial output. The heat conducting inner housing longitudinal wall 10*a* may range in shape from plain circular to finned circular cross section for increasing heat transfer area, with the core 8 cross section being only slightly smaller and mimicking the shape of the heat conducting inner wall 10*a* of the inner housing. This construction provides a uniformly very thin (e.g. 0.010 inches) washer fluid flow channel heat transfer chamber 7 and thereby, with forced convection pumped washer fluid, forces an ultra thin and very low thermal resistance fluid boundary layer (less than 0.005 inches thick) from the washer fluid inlet 15 to the washer fluid outlet 16.

Figure 1:
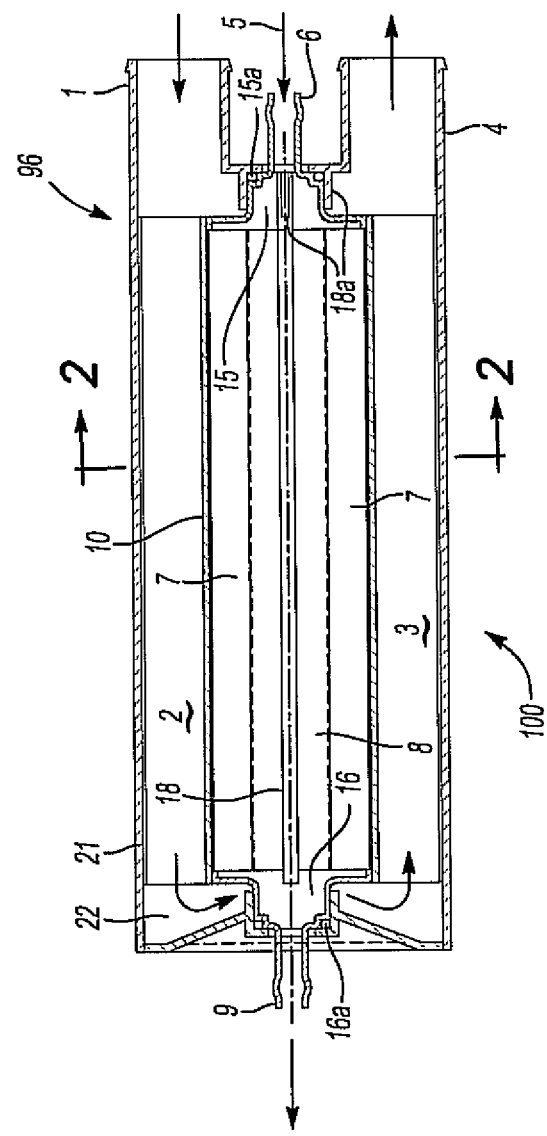
FIG. 1 is a longitudinal sectional view illustrating a first preferred embodiment of the present invention.
Figure 2:
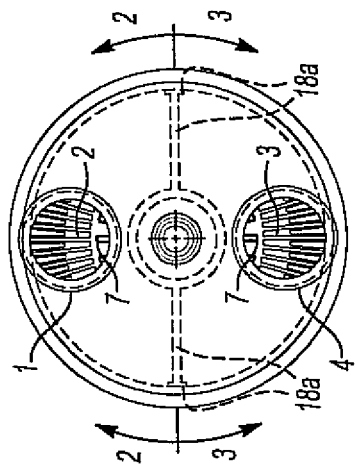
FIG. 2 is a sectional view taken along line 2-2 in FIG. 1.

The outer surface 17 of the intermediate outer finned/inner finned member 10 forms a second fluid flow chamber 33 for engine coolant in conjunction with an outer housing 21 sealingly enclosing the washer fluid inner chamber enclosure 10 plus barbed end caps 6 and 9 with O-ring seals 15*a* and 16*a*. The outer surface 17 of the intermediate outer finned/inner finned member 10 is shaped with a plurality of closely and uniformly spaced heat conducting fins, all of which maintain a close fin tip clearance 31 or having contact with the inner wall 32 of the outer housing 21, except for two opposing fins which are always in longitudinally sealing contact at points 18 with the inner surface of the outside housing 21 to form the finned half annulus flow channels 2 and 3 in connection with dam 18*a* for the coolant to flow from the inlet hose barb 6 through one half 2 of the outer housing chamber to the opposite end 22 then cross over to flow back outwardly through the opposite half 3 of the outer housing chamber to the coolant outlet hose barb 4. The outside housing 21 is typically constructed of low heat conductivity high strength proven automotive cooling system material such as fiberglass filled nylon or polyphenylene sulfide (PPS) and can have integral fins 23 mimicking with close clearance (e.g. 0.010 in.-0.020 in.) to the outer fins of the aluminum intermediate member 10. The outer housing 21 may be constructed of a higher strength metal if necessary as might be required with the heater being applied in a higher pressure and hotter heat source system. In the case of a very high pressure, high temperature heat source such as a CO2 heat pump, in order to better contain the pressure the inner finned flow chamber may be used for the heating (CO2) fluid and the outer finned chamber for the lower pressure (washer) fluid to be heated. The outer housing coolant inlet barb 1 and outlet barb 4 are for connection with the engine coolant line preferably in series with the cabin heater line coming from, or returning to the engine, re. FIG. 2.

Aluminum parts are anodized or coated as needed for corrosion protection with minimal degradation to heat transfer characteristic.

The heater is preferably mounted in a vertical position with the washer fluid inlet on top and washer fluid outlet on the bottom to facilitate fluid thermal purging back to the reservoir instead of out the nozzles or fluid delivering wiper blades. Also the coolant inlet and outlet barbs are preferably mounted vertically to avoid air entrapment.

Other similarly effective configurations could also be done, such as planar rather than circular which could also provide for three or more fluids, or by switching heating fluid to the inner flow chamber, and the fluid(s) to be heated to the outer flow chamber(s). Also, the outer flow chamber(s) could have the inlet and outlet at opposite ends of the heat exchanger.

Upon activation of the conventional washer/wiper switch the washer fluid quickly (in less than 1 second) fills the very small volume inner washer fluid heating chamber 7 which is often in an empty state, having been purged empty from the alcohol laden low boiling point, about 158° F., washer fluid being heated by the higher thermostatically controlled, about 200° F., engine coolant. The substantially heated fluid emerges instantly from the either conventional nozzles 13 or the preferred wiper squeegee integral nozzles 13*a*, to provide instantly delivered continuous on demand heated fluid deicing and cleaning action to the windshield and wiper blades.

Because the heater has a very high heat transfer rate, heat recovery time is virtually instantaneous when closely repeated deice/wash cycles are desired. Upon washer shutdown the residual fluid between the heater and the nozzles remains in the washer lines by virtue of check valve 12 while the very small amount of washer fluid in the washer heater might soon purge—because of low alcohol laden washer fluid boiling temperature—back toward the washer reservoir thereby conserving the purged fluid, and stopping calcium/mineral buildup and any significant thermal energy drain from the cabin heater coolant circuit.

Upon engine shutdown in freezing temperatures thermal contraction from cooling may cause washer fluid to be drawn back into the very small washer fluid heating chamber 7. Any subsequent freeze up due to lack of antifreeze solution will leave the fluid heater undamaged primarily by virtue of the very small amount of freeze expansion of the preceding very small amount of contained liquid.

Other preferred embodiments below include electric heating elements as a heat source for more rapid deicing at cold engine start conditions and for use in electric powered vehicles. Similarities in construction and function to the above described embodiment will become apparent.

FIGS. 8-12 illustrate a preferred embodiment system construction of a thermostatically controlled 27 electric washer fluid heater having relatively low power consumption such as about 600 watts, and containing insulated 24 thermal storage heat conducting mass 25. The electric heating element 26 is in intimate contact with and wraps the anodized and therefore electrically insulated thermal storage aluminum mass 25. The vehicle's normal ignition run switch 34, or other suitable control, in conjunction with high hysteresis thermostat 27 and 600 watt power relay 20 power the electric heating element 26 when ambient temperature is below about 40° F. and the thermal storage mass is then heated to between 400° F. and 500° F. and is insulated such that an equilibrium thermal mass temperature of 400° F.-500° F. is maintained and primarily controlled by the high hysteresis 40° F. sensing thermostat. Upon activation of the washer pump by the standard steering column mounted switch cold fluid enters the heater at inlet barb 35 and is instantly heated in the inner finned and cored 8*b* heating chamber 7*a* similar to that described in FIGS. 1-6, with the thermal storage mass 25 serving as the instantaneous heat source. The substantially heated fluid emerges from the heater outlet barb 36 to proceed to the nozzles. Air gaps 37 are sized to throttle heat transfer from the thermal storage mass so as to control maximum fluid outlet temperature.

Figures 3, 3A:
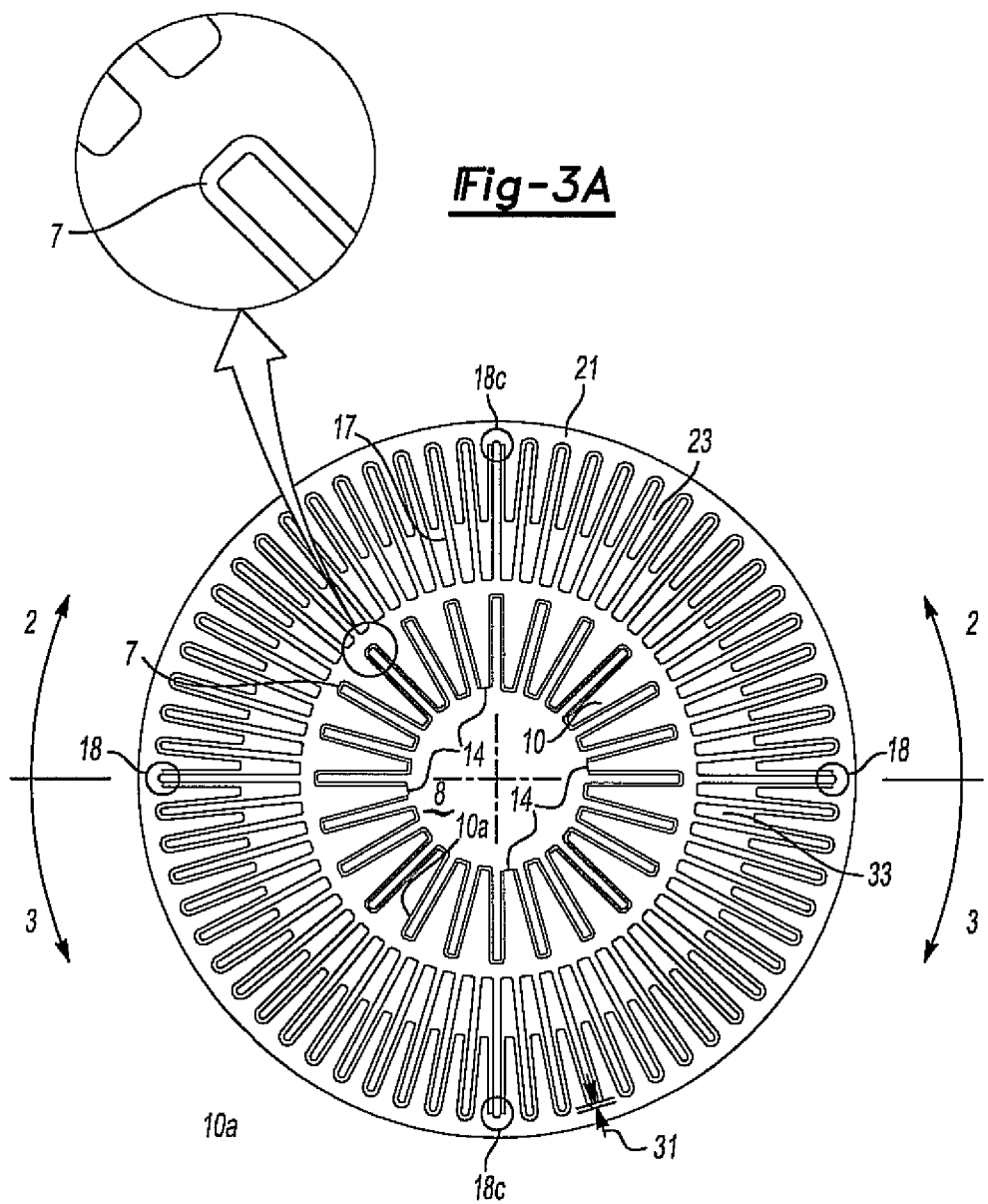
FIG. 3 is an end view of the preferred embodiment of the present invention and with parts removed for clarity.
FIG. 3A is a view taken along the circle in FIG. 3.
Figure 6:
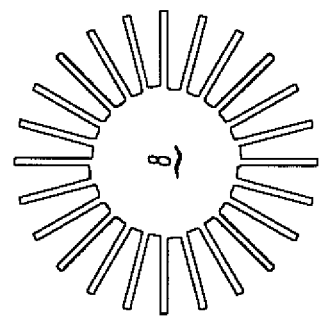
FIG. 6 is an end view of a core.
Figure 5:
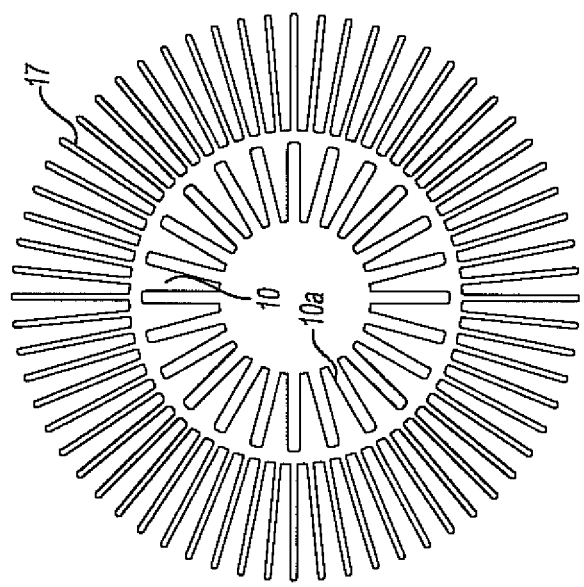
FIG. 5 is an end view illustrating a subhousing inserted into one type of housing.
Figure 4:
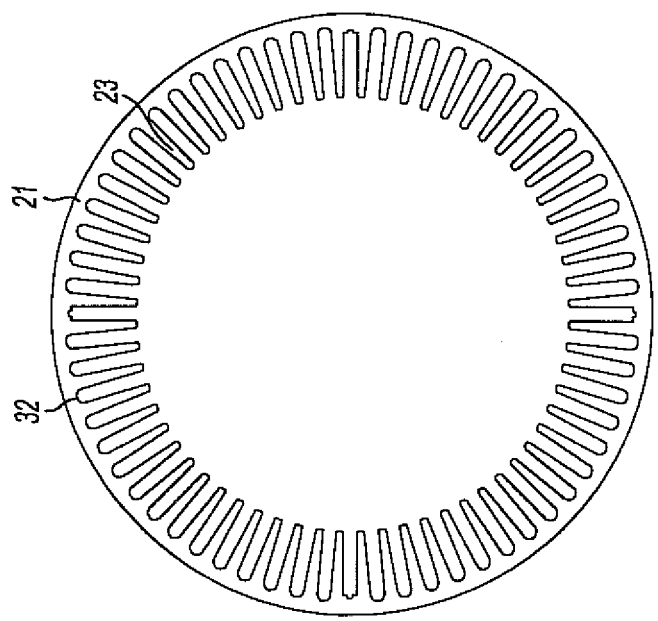
FIG. 4 is an end view illustrating one type of housing.
Figure 14:
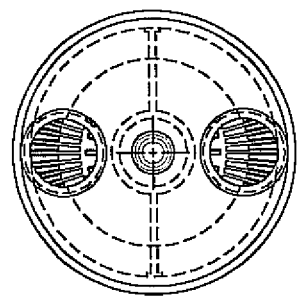
FIG. 14 is an end view of the third preferred embodiment shown in FIG. 13.
Figure 13:
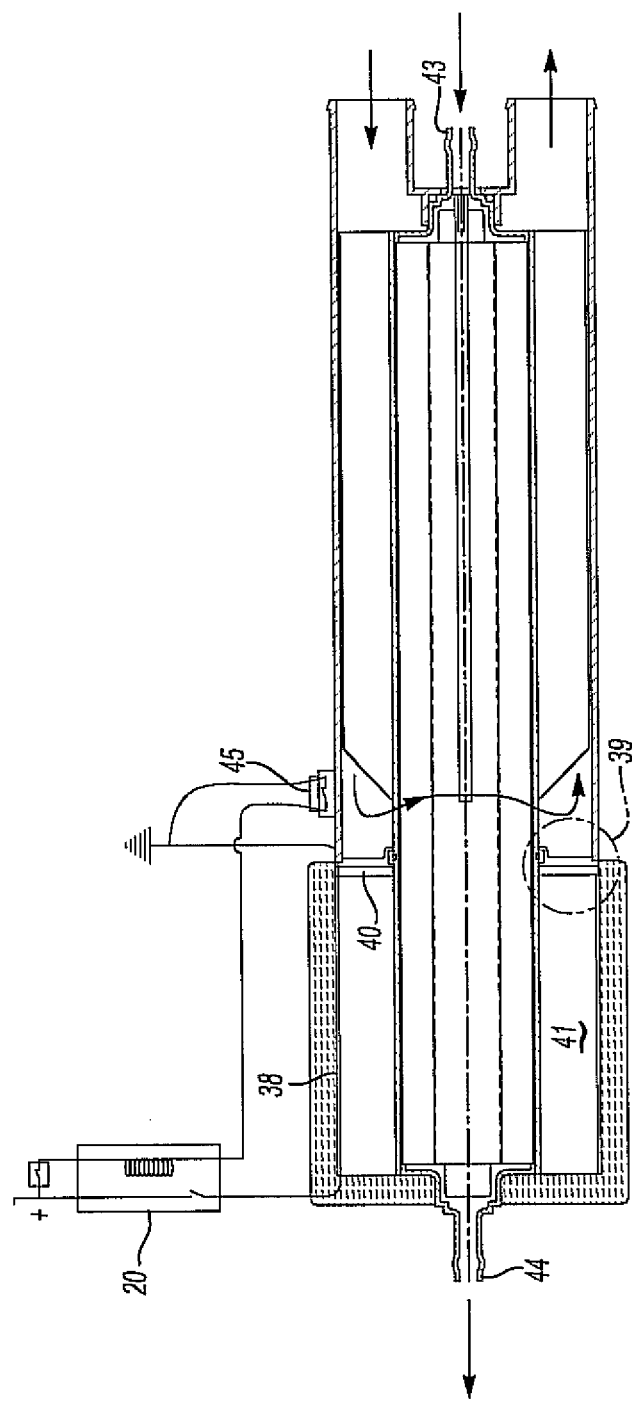
FIG. 13 is a longitudinal sectional view illustrating a third preferred embodiment of the present invention.

FIGS. 13-14 illustrate a preferred embodiment construction of a combination washer fluid heater having engine coolant as a heat source similar to that described above in FIGS. 1-6, and integrally joined in zone 39 with an electric washer fluid heater having relatively low power consumption such as 600 watts, similar to that described in above FIG. 3 containing thermally insulated thermal storage heat conducting mass as an instant heat source and separated by heat source thermal barrier wall and air gap 40. As in FIG. 8 already described, the electric heating element 38 is in intimate contact with and wraps the thermally conductive, anodized, and thereby electrically insulated, aluminum thermal storage mass 41. Upon cold engine start below about 40° F. thermostatically sensed ambient temperature the electric heating element 38 heats the thermal storage mass 41, which is thermally separated from the presently cold engine coolant passage by means of thermal barrier 40. After a short time (about 3-4 minutes) of thermal storage mass electric heating and engine coolant warm up, and upon washer pump activation by the conventional steering column mounted washer switch, cold washer fluid enters the heater at inlet 43, passes through the now slightly warm engine coolant zone and into the now substantially heated electrically heated thermal storage mass 41 zone and is instantly and greatly heated, then emerges from outlet barb 44 to be sprayed and wiped onto the windshield with enough thermal energy to clear a significant amount of windshield frost within 30 seconds. The thermostat 45 is configured to have about 25° F. degrees temperature hysteresis and mounted to sense a combination of ambient and engine coolant temperature. The electric heater will become thermostatically disabled when engine coolant exceeds about 65° F., after which time the engine coolant heated section of the heater will have ample power to effectively heat washer fluid without electrical heating drain. Air gaps 37, as shown in FIG. 3, may also be employed to throttle maximum exiting fluid temperature from the electrically thermal storage mass section of the heater.

FIGS. 15 and 16 illustrate a preferred embodiment system construction of an electric washer fluid heater similar to that shown in FIG. 13 but having relatively high power consumption such as 3500 watts, and absent of thermal storage mass. Also shown is a flow sensing Hall Effect switch 28 (or alternatively a magnet/reed switch flow sensor) which, in combination with a Hall Effect electronic amplifier 51 (or reed switch relay), activates the high current solenoid switch 46 to supply heating current to the resistance heating element 30. With ambient temperature below about 40° F. as sensed by thermostat 49 and upon cold engine start with ignition run switch on and upon driver activation of the standard steering column mounted washer switch cold fluid is pumped into washer fluid heater inlet barb 50 thereby moving spring loaded piston shuttle 47 magnet 48 into closer proximity 48*a* of Hall Effect sensor 28 which triggers Hall sensor processor 51 and causes high current solenoid switch 46 to close to provide high amperage heating current to heating element 30. Washer fluid is thereby instantly and substantially heated and emerges from heater outlet barb 52 to contain ample thermal energy to clear a significant windshield frost within 30 seconds of a cold engine start. Since this is a very high power electrical load which, for vehicles with very limited electrical supply capability, might only be appropriate to use on a cold engine start and not during driving, it is optional to automatically disable the heater during driving by grounding through the neutral start switch only. Also to better protect the electrical system a low voltage disabling sense 51*a* may be incorporated to prevent the heater from turning on if vehicle system voltage is too low. Filter screen 53 is to protect the flow sensing shuttle switch from foreign particles inhibiting shuttle movement. To make a failsafe guard against overheating as, for example, might be rarely caused by the welding of power relay contacts, a thermal fuse joint 54 is shown. For those skilled in the art the highly electromechanical control system described here could be effectively substituted by more fully electronic software based controls using same or similar logic without substantially improving functional effectiveness of this washer fluid heater. In fact certain vehicles may already have control components on board, such as an electronic body controller, which could be cost effectively utilized to serve this washer fluid heater.

FIGS. 17 and 18 illustrate a preferred embodiment construction of a combination washer fluid heater having engine coolant as a heat source integrally joined with an electric washer fluid heater having relatively high power consumption such as 3500 watts, and not containing a thermal storage mass. Also illustrated is a flow sensing Hall Effect shuttle 59 mounted magnet 56 activated sensor 57 (alternatively a reed/magnet switch) which, in combination with a Hall Effect electronics amplifier 55 (or reed relay) activates the high current solenoid switch 58 to supply heating current to the heating element. This heater operates in the same manner as described for FIG. 4 above except as soon as the engine is started on a cold start below about 40° F. the heater can be immediately activated, and by virtue of its high electrical heating power, the system will then be able to clear a typical frosted windshield within 30 seconds of starting the cold engine.

FIG. 19 illustrates a preferred embodiment fluid delivering wiper blade with progressively more closely spaced and opposite side staggered jets 59 toward more outer reaches from the wiper arm pivot for delivering a nearly perfectly uniform film of washer fluid across the wiped area of the windshield, and also containing dedicated fluid jets 60 to each pivot joint of the blade structure, and also wiper blade fluid supply hose quick connecting means 61 and plugging means 62 at outer tip of blade.

FIGS. 20 and 21 illustrate a preferred manufacturing process for perforating progressively more closely spaced orifice patterns from heel to tip in the wiper blade rubber squeegee. The continuously running process feeds the squeegee extrusion 77 into motor and gear driven perforating wheels 74, 75 and 76. (A dual opposed squeegee, prior to slitting the wiping edge, as is commonly manufactured in the industry, can also be configured but is not shown here for illustration simplicity.) The wheel perimeters correspond to the final cut length of the squeegee and contain piercing points positioned so that no points interfere with other points of other wheels at the squeegee piercing position. A squeegee cutoff area 79 of wheels 75 and 76 is configured with a cutoff blade on wheel 75 and a cushioned anvil on wheel 76 to preserve the cutoff blade 80 edge sharpness. The perimeter of wheels 75 and 76 are shaped to distort the fluid conduit hole 81 such that, when the conduit returns to relaxed position the perforations are aimed downward toward the windshield when the blade is mounted on the vehicle. Piercing points 78 are preferably blades shaped to produce squeegee slits of desired length. Perforating wheel 74 is for making jets to blade frame joints.

Figure 22:
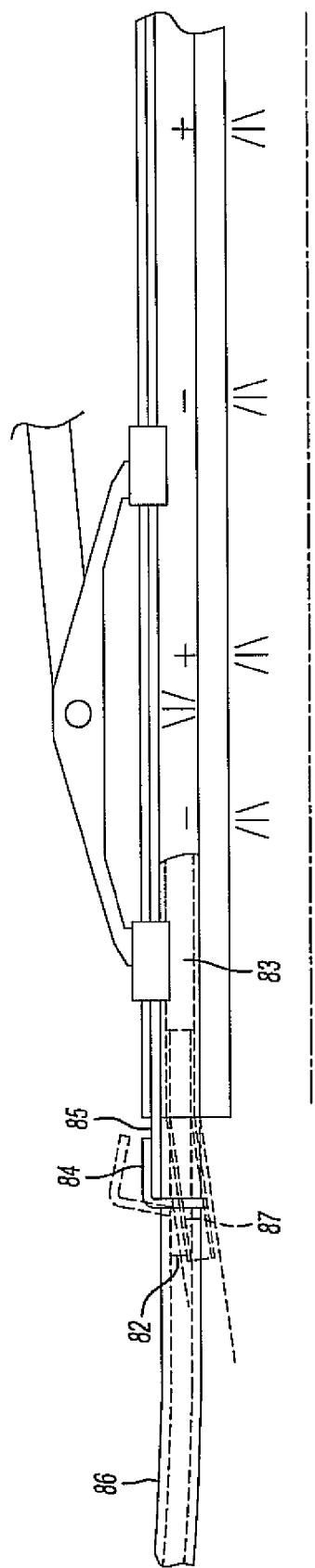
FIG. 22 is a fragmentary view illustrating a preferred embodiment of the windshield wiper blade.
Figure 23:
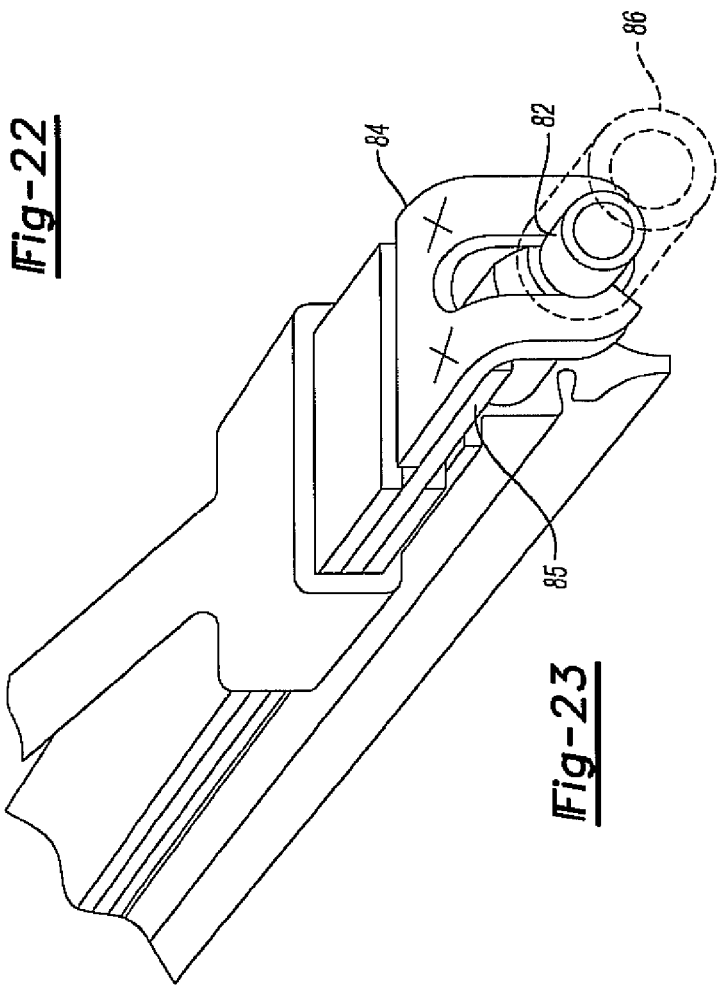
FIG. 23 is a fragmentary end view of the preferred embodiment of the wiper blade.

FIGS. 22 and 23 illustrate a preferred construction of a quick connect/disconnect joining of the washer fluid hose to the heel of the wiper blade squeegee. Rigid tube 82 is prebonded into squeegee conduit 83. Right angle open end clip 84 is welded to the conventional flexible squeegee metal spine 85. Hose 86 connection is effected by flexing tube/squeegee heel downward, slipping hose onto tube to butt against squeegee heel end and then snap up into the open end of clip aligned with matching necked down area 87 in tube resulting in a convenient to execute, aesthetically pleasing and robust connection. For blade replacement the disconnect process would be the reverse of this connecting procedure.

FIGS. 24 and 25 illustrate a preferred process for perforating the wiper blade squeegee while in assembly with blade frame 94. Stationary programmed laser heads 88 cut perforations 89 into rubber squeegee 90 with laser beam 91. Squeegee support rod 92 passes through squeegee conduit and connects to carriage 93 to hold squeegee straight during perforating process.

Figure 26:
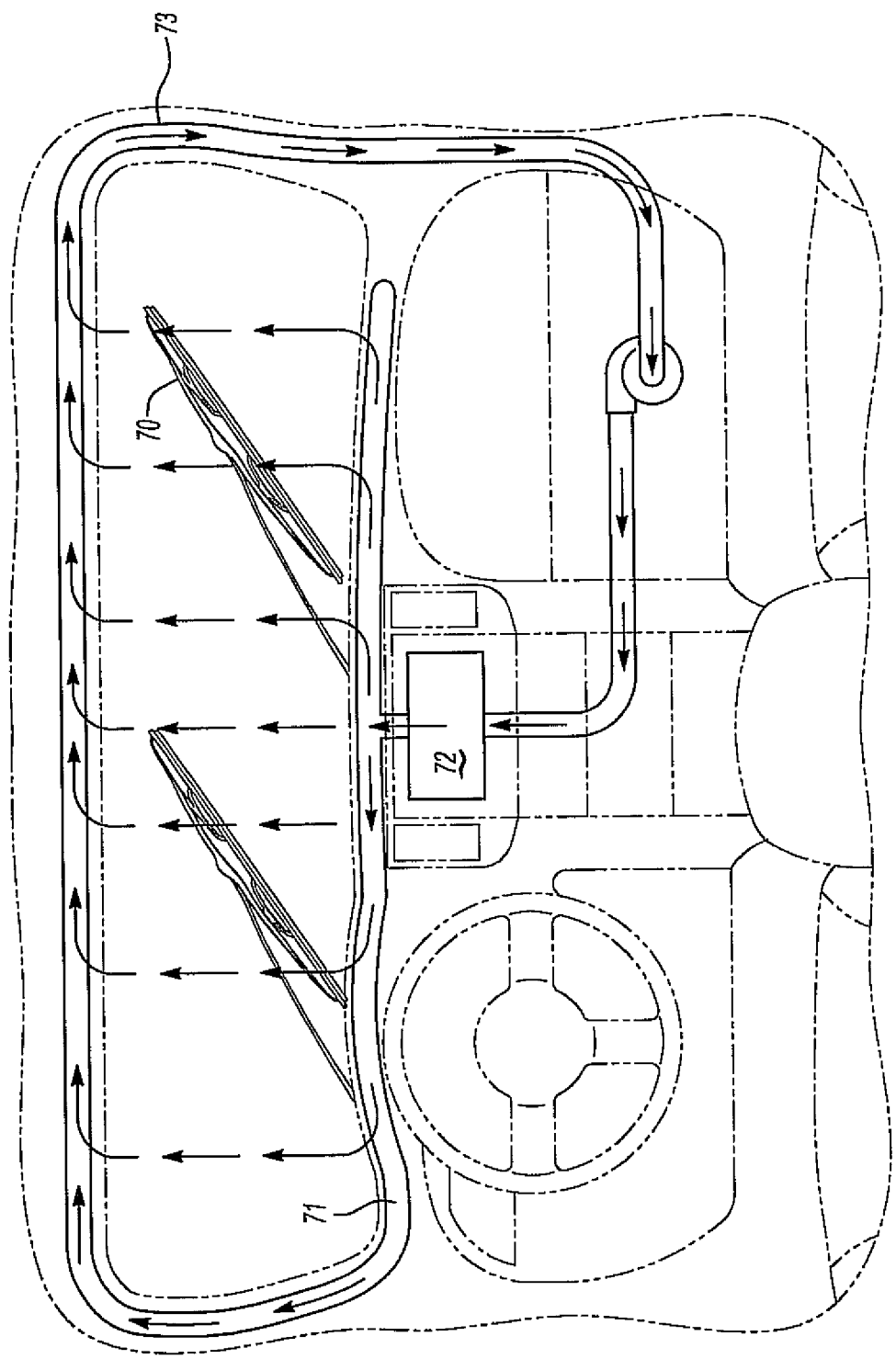
FIG. 26 is a fragmentary view of a passenger compartment of an automotive vehicle.

FIG. 26 illustrates a preferred embodiment of a vehicle's complete windshield defroster/defogger system employing a heated washer wiper system for primary defrosting combined with a small and limited airflow duct for the interior surface of the windshield, and eliminating the conventional large airflow defroster duct normally contained in the dash panel. The resulting extra space within the dash panel may now be used for packaging other components for which dash panel space would not otherwise be available. Also, more cabin heat can thereby be provided occupants since hot air defroster energy has been greatly reduced. Heated washer fluid delivering wiper blades 70 serve to rapidly, and with high thermal efficiency, clear initial heavier frost on the exterior surface of the windshield while a small low flow defrosting and defogging duct 71 with heat source 72 serves to maintain a clear windshield during normal operation of the vehicle. This duct can also provide dehumidified air from the air conditioning system to aid in demisting the inside surface of the windshield. Optional return air duct 73 can be employed at the top interior surface of the windshield and can be cost-effectively formed by utilizing ducting shapes of the headliner and windshield header frame structure to more effectively cause the defrosting/defogging maintenance air to adhere to the upper area of the windshield to minimize this air from otherwise entering the cabin and causing loss of clearing of the upper area of the windshield.

With reference now to FIGS. 27-30, a still further washer fluid heater 100 is shown. The heater 100 includes a housing 102 which forms an elongated and generally cylindrical housing chamber 104.

Preferably, the housing 102 is formed from two housing shells 106 and 108, each of which is substantially cylindrical in shape and having an open end 110 and 112, respectively. The open ends 110 and 112 of the housing shells 106 and 108, respectively, are secured together in any conventional fashion, such as by spin welding.

A generally tubular and cylindrical subhousing 114 is disposed within the housing chamber 104 and divides the housing chamber 104 into an annular outer housing chamber 116 formed between the subhousing 114 and the housing 102, and an inner housing chamber 118 formed within the subhousing 114. The subhousing 114, furthermore, is constructed of a thermally conductive material, preferably a metal such as aluminum, and has a plurality of circumferentially spaced fins 120 (FIG. 28) which extend substantially entirely radially across the outer housing chamber 116. Preferably, the subhousing 114 comprises a metal extrusion.

Figures 28, 29, 30:
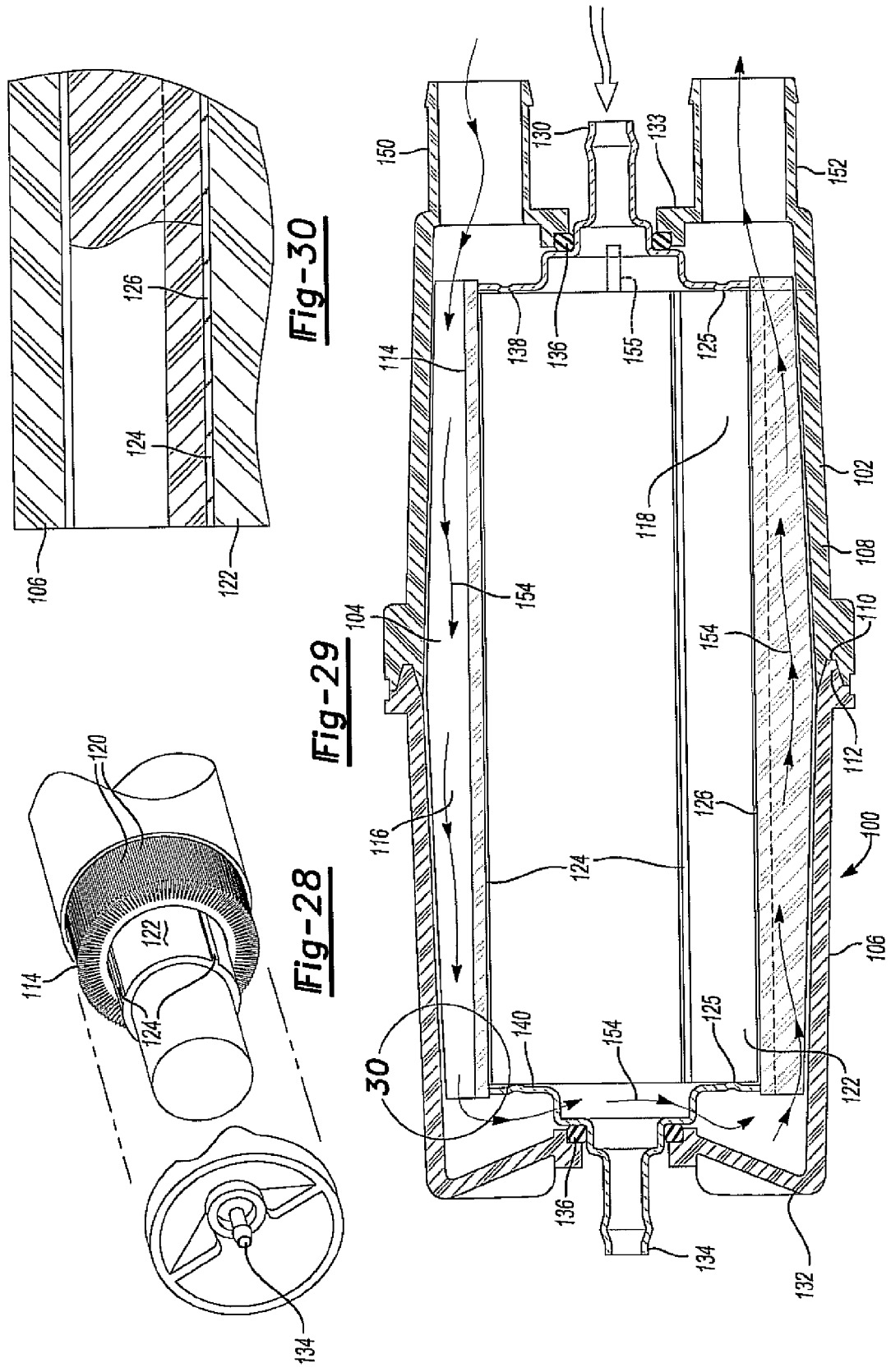
FIG. 28 is a fragmentary exploded view of the preferred embodiment of the present invention.
FIG. 29 is a longitudinal sectional view taken along line 29-29 in FIG. 27.
FIG. 30 is a fragmentary sectional view taken along circle 30 in FIG. 29.

Referring now to FIGS. 28-30, a cylindrical core 122 is disposed within the inner housing chamber 118. This core 122 includes a plurality of standoffs 124 which are circumferentially spaced around the core 122. Preferably the standoffs 124 are elongated and extend along the length of the core 122. The standoffs 124 center the core 122 in the inner housing chamber 118 such that a thin and preferably uniform annular chamber 126 is formed between the core 122 and the subhousing 114.

Figure 12:
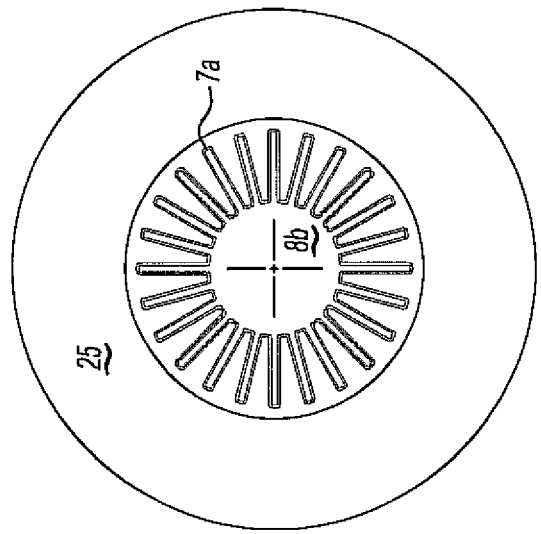
FIG. 12 is an end view similar to FIG. 10 but illustrating the FIG. 11 core inserted.
Figure 11:
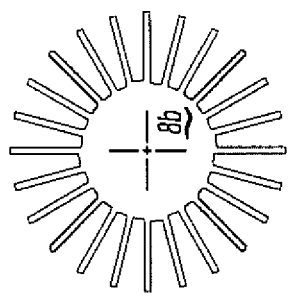
FIG. 11 is an end view illustrating a core for the second preferred embodiment.
Figure 10:
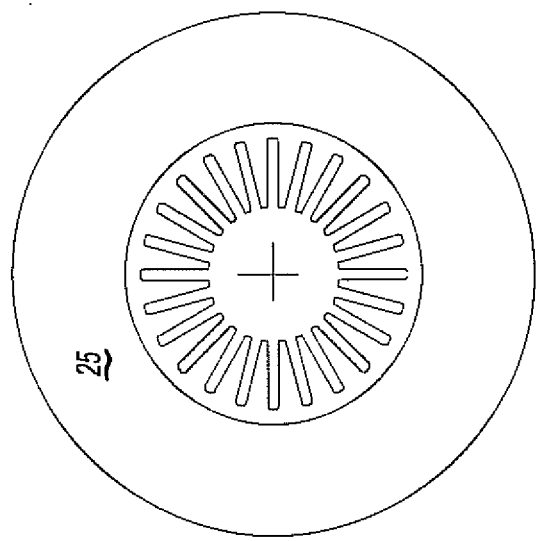
FIG. 10 is an end view illustrating the second preferred embodiment.

The annular chamber 126 shown in FIGS. 28-30 is tubular and cylindrical in shape. However, alternatively the annular chamber 126 may include interlaced fins such as shown in FIGS. 10-12.

The core 122 is made of a thermally conductive material, such as aluminum. As such, the core 122 not only rapidly heats up, but also stores the heat energy.

The height of the standoffs 124 defines the radial thickness of the annular chamber 126. As best shown in FIG. 29, the radial thickness of the annular chamber 126 is very small compared to the internal size of the subhousing 114. The core 122 is dimensioned such that the ratio of the area of the wetted wall surface of the chamber 126 to the volume of the chamber 126 equals at least 700 meters$^2$/meters$^3$ and preferably is in excess of 2000 meters$^2$/meters$^3$.

As best shown in FIG. 29, a windshield washer fluid inlet 130 is attached to one end 133 of the housing 102 while, similarly, a windshield washer fluid outlet 134 is attached to the other end 132 of the housing 102. The windshield washer fluid inlet 130 and outlet 134 are both fluidly open to opposite ends of the annular chamber 126. Both the fluid inlet 130 and fluid outlet 134 also include a cap 138 and 140, respectively, which sealingly extend across the open ends of the subhousing 114. This sealing in combination with fluid seals 136 between the inlet 130 and outlet 134 and the housing 102 fluidly seal the inlet 130 and outlet 134 to the housing 102 and fluidly isolate the annular chamber 126 from the outer housing chamber 104. Dimples 125 on the end caps 138 and 140, however, space the end caps 138 and 140 away from the core 122 and establish fluid communication between the inlet 130, outlet 134 and the annular chamber 126 to thereby establish fluid flow from the inlet 130, through the chamber 126 and out through the outlet 134.

Figure 27:
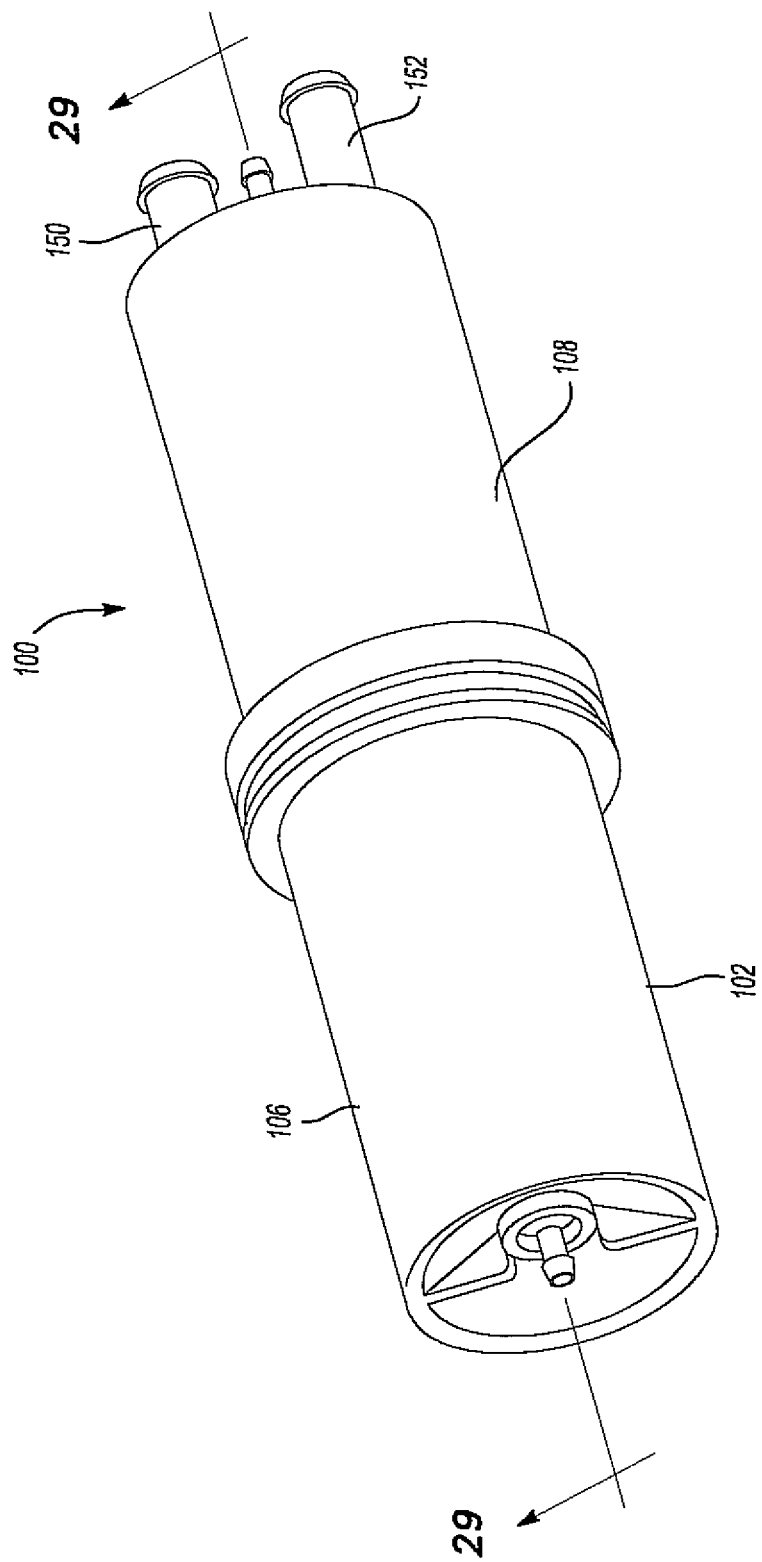
FIG. 27 is an oblique view illustrating a preferred embodiment of the present invention.

Referring now to FIGS. 27 and 29, an engine coolant inlet 150 is formed in the housing 102 and is open to the outer housing chamber 104. Similarly, a coolant outlet 152 is also mounted to the housing 102 and open to the outer housing chamber 104 at a position spaced from the coolant inlet 150. As shown in the drawing, both the coolant inlet 150 and the coolant outlet 152 are mounted to the same end 133 of the housing 102. However, the coolant inlet 150 and coolant outlet 152 can be mounted to opposite ends of the housing 102 without deviation from the spirit or scope of the invention.

Optionally, a filter may be associated with the washer fluid inlet 130 to prevent debris from entering into the interior of the subhousing 114.

In operation, the windshield wiper fluid inlet 130 is connected to a source of pressurized windshield washer fluid, such as the windshield washer fluid pump found on most vehicles. The windshield washer fluid outlet 134 is then fluidly connected to either spray jets mounted on the vehicle and directed to the vehicle windshield or to a windshield wiper blade such as the type already previously described. Consequently, upon activation of the windshield washer fluid pump, windshield washer fluid is pumped into the inlet 130, through the annular chamber 126 and out through the washer fluid outlet 134.

Figure 31:
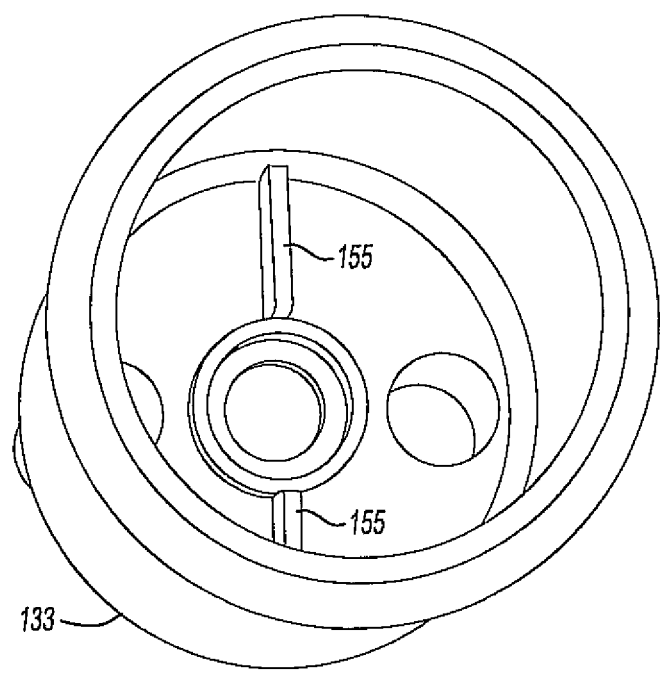
FIG. 31 is an interior end view of one end of the housing.

Simultaneously, heated engine coolant fluid flows into the coolant inlet 150, through the outer housing chamber 104 and out through the coolant outlet 152. Although some leakage of engine coolant may flow directly from the inlet 150 and to the outlet 152 without flowing longitudinally along the length of the housing 102, a majority of the coolant flow through the housing 102 is channeled by the fins 116 on the subhousing 114 from one end 133 of the housing 102 and to its other end 132 as shown by arrows 154. A fluid dam 155 (FIG. 31) at the end 133 of the housing abuts against the end cap 138 and prevents fluid flow directly from the inlet 150 to the outlet 152.

In order to channel the engine coolant entirely through the outer housing chamber 104 and minimize leakage directly from the coolant inlet 150 to the coolant outlet 152, preferably an interference fit is created between the fins 120 and the housing 102.

In operation, the heat from the engine coolant is conducted by the subhousing 114 to heat the windshield washer fluid in the annular chamber 126. Since the ratio of the wetted area of the annular chamber 126 to the volume of the chamber 126 is so high, the heating of the windshield washer fluid in the annular chamber 126 is not only rapid, but nearly complete. Indeed, the temperature of the windshield washer fluid from the outlet 134 approximates the temperature of the engine coolant.

As a practical matter, after use of the windshield washer system, any windshield washer fluid contained within the annular chamber 126 will simply boil off back to the reservoir.

Having described my invention, it can be seen that the present invention provides a simple and yet highly effective heated windshield wash fluid system which both quickly and effectively deices and defrosts an automotive vehicle windshield and wiper. Having described my invention, however, many modifications thereto will become apparent to those skilled in the art to which it pertains without deviation from the spirit of the invention as defined by the scope of the appended claims.

I claim:

1. In combination with an automotive vehicle having an engine coolant system and a fluid windshield wiper cleaning system, a windshield washer fluid heater comprising:

a housing having two ends which defines a housing chamber, a subhousing disposed in said housing chamber, said subhousing being constructed of a thermally conductive material and dividing said housing chamber into an outer housing chamber between said housing and said subhousing and an inner housing chamber inside said subhousing, said inner and outer housing chambers being fluidly isolated from each other, a core disposed in said inner housing chamber which forms an annular chamber between said core and said subhousing, a washer fluid inlet on said housing open to one end of said annular chamber and a washer fluid outlet on said housing open to the other end of said annular chamber, said washer fluid inlet and said washer fluid outlet being fluidly connected to the windshield wiper cleaning system, an engine coolant inlet fluidly connected to the coolant system and open to said outer chamber and an engine coolant outlet fluidly connected to the coolant system and open to said outer chamber at a position spaced from said inlet so that most of the coolant flow into said coolant inlet flows through the outer housing chamber and out through the coolant outlet, wherein said core is dimensioned such that the ratio of wetted surface area of the annular chamber to the volume of the annular chamber exceeds 700 meters$^2$/meters$^3$.

2. The heater as defined in claim 1 wherein said washer fluid inlet is located at one end of said housing and said washer fluid outlet is located at the other end of said housing.

3. The heater as defined in claim 1 wherein said engine coolant inlet and said engine coolant outlet are mounted on one end of said housing at circumferentially spaced positions.

4. The heater as defined in claim 1 wherein said subhousing comprises a metal extrusion.

5. The heater as defined in claim 1 wherein said subhousing is a one piece aluminum extrusion.

6. The heater as defined in claim 1 wherein the radial width of said annular chamber is less than 0.020 inches.

7. The heater as defined in claim 1 wherein said core is dimensioned such that the ratio of the wetted surface of the annular chamber to the volume of the annular chamber exceeds 2000 meters$^2$/meters$^3$.

8. The heater as defined in claim 1 wherein said core is formed of a thermally conductive material and forms a heat storage member.

* * * * *